United States Patent [19]

Ejima et al.

[11] Patent Number: 4,547,275

[45] Date of Patent: Oct. 15, 1985

[54] PROCESS FOR TREATING SURFACE OF ALUMINUM FOIL FOR USE AS ELECTRODE OF ELECTROLYTIC CAPACITORS

[75] Inventors: Tatsuhiko Ejima, Sendaishi; Kozo Arai, Sakaishi; Eizo Isoyama, Saishi; Tadao Fujihira, Sakaishi, all of Japan

[73] Assignee: Showa Aluminum Kabushiki Kaisha, Osaka, Japan

[21] Appl. No.: 695,264

[22] Filed: Jan. 28, 1985

[30] Foreign Application Priority Data

Feb. 3, 1984 [JP] Japan .................................. 59-18943

[51] Int. Cl.$^4$ ................................................. C25F 3/04
[52] U.S. Cl. .............................. 204/129.75; 204/129.9; 204/129.95
[58] Field of Search ...................... 204/129.75, 129.95, 204/129.9

[56] References Cited

U.S. PATENT DOCUMENTS

| | | | |
|---|---|---|---|
| 3,477,929 | 11/1969 | Namikata | 204/129.95 |
| 3,887,447 | 6/1975 | Sheasby | 204/129.95 |
| 4,140,599 | 2/1979 | Yamasaki | 204/129.95 |
| 4,432,846 | 2/1984 | Honeycutt | 204/129.95 |

Primary Examiner—T. M. Tufariello
Attorney, Agent, or Firm—Collard, Roe & Galgano

[57] ABSTRACT

A process for treating the surface of aluminum foil for use as an electrode of electrolytic capacitors to increase the surface area of the foil to the greatest possible extent includes the three steps of pre-etching treatment, intermediate nitric acid treatment and post-etching treatment. The pre-etching treatment is conducted electrolytically in an aqueous solution of chromic acid and at least one of chromic acid and chromates. The intermediate nitric acid treatment is carried out by immersing the pre-etched foil in an aqueous solution of nitric acid to remove a chromate film formed by the pre-etching from the foil surface, especially from the interior of the resulting pits. The post-etching treatment is conducted electrolytically in an aqueous solution of hydrochloric acid, or hydrochloric acid and an oxidizing acid.

7 Claims, No Drawings

4,547,275

PROCESS FOR TREATING SURFACE OF ALUMINUM FOIL FOR USE AS ELECTRODE OF ELECTROLYTIC CAPACITORS

BACKGROUND OF THE INVENTION

The present invention relates to a process for treating the surface of aluminum foil for use as an electrode of electrolytic capacitors, and more particularly to an improved process for etching aluminum foil to enlarge the surface of the foil to the greatest possible extent and obtain an increased capacitance.

It is desired that the aluminum foil useful as an electrode of electrolytic capacitors have the largest possible surface area and a great capacitance per unit volume. Generally, the aluminum foil for this use has heretofore been etched electrochemically or chemically and thereby increased in its substantial surface area. Various improvements have been made in etching processes for forming a larger number of enlarged etching pits of increased depth in order to achieve a maximum area increase ratio.

A group of inventors including one of the present inventors has already proposed an improved etching process in Japanese Patent Application No. 55-143214 (Published Unexamined Japanese Patent Application No. 57-66615). The proposed etching process of the prior art comprises two divided steps of electrolytic etching. In the pre-etching step, aluminum foil is electrolytically treated in a solution of hydrochloric acid and an acid, such as sulfuric acid or chromic acid, which electrolytically forms a porous oxide film on the surface of the foil, to form a large number of relatively deep etching pits in the surface while inhibiting overall dissolving of the foil surface. The aluminum foil is then subjected to electrolytic post-etching treatment in an aqueous solution of hydrochloric acid and an oxidizing acid, whereby the etching pits formed by the pre-etching step are concentrically attacked and thereby enlarged and deepened. While this process is very effective for achieving a high area increase ratio, we carried out experiments and research to find that when the pre-etching treatment is conducted in an aqueous solution of hydrochloric acid, and chromic acid or a chromate, a larger number of etching pits of increased depth can be formed most effectively with the foil surface inhibited from dissolving. However, we found that the process then involves a problem. When the pre-etching treatment is conducted using the aqueous solution which contains chromic acid or chromate, the chromate film formed on the surface of the aluminum foil acts to inhibit etching, making it impossible for the post-etching step to enlarge the etching pits in diameter to a fully satisfactory extent.

SUMMARY OF THE INVENTION

Accordingly we have further conducted experiments and research to overcome the above problem and found that when the pre-etched aluminum foil is treated by post-etching after the chromate film formed on the foil surface by the pre-etching treatment of the prior art has been removed at least partially by an intermediate nitric acid treatment, a higher area increase ratio can be achieved to give an increased capacitance without impairing the mechanical strength of the foil. The present invention has been accomplished based on this finding.

Stated more specifically, the present invention provides a process for treating the surface of aluminum foil for use as an electrode of electrolytic capacitors which is characterized by subjecting the aluminum foil to an electrolytic pre-etching treatment in an aqueous solution containing hydrochloric acid and at least one compound selected from the group consisting of chromic acid and chromates, subjecting the pre-etched aluminum foil to an intermediate nitric acid treatment, and subjecting the resulting aluminum foil to an electrolytic post-etching treatment in an aqueous solution containing hydrochloric acid, or hydrochloric acid and an oxidizing acid.

According to the present invention, aluminum foil is treated by electrolytic pre-etching in an aqueous hydrochloric acid solution containing at least one of chromic acid and chromates, so that the pre-etching step forms numerous deep etching pits while forming a chromate film on the surface of the aluminum foil to inhibit the foil surface from dissolving. The pre-etching step is followed by a nitric acid treatment for mitigating or eliminating the etching inhibiting effect of the chromate film. The resulting aluminum foil is then treated by electrolytic post-etching in an aqueous solution containing hydrochloric acid, or hydrochloric acid and an oxidizing acid. The etching pits produced by the electrolytic pre-etching step can therefore be enlarged and deepened effectively, consequently achieving a remarkably improved area increase ratio and affording a greatly increased capacitance. This permits fabrication of compacted electrolytic capacitors with a reduced weight. The invention further reduces the likelihood that the aluminum foil will be broken during a series of steps of etching, chemical conversion, assembly, etc. to assure improved productivity because the improved area increase ratio will not impair the mechanical strength of the foil.

Other objects and advantages of the present invention will become more apparent from the following detailed description.

DETAILED DESCRIPTION OF THE INVENTION

The treatment steps of the present invention will be described below individually in detail. The percentages used herein and in the appended claims are all by weight.

Electrolytic pre-etching step

The solution for treating aluminum foil in the electrolytic pre-etching step has a hydrochloric acid concentration of 2 to 15%. If the concentration is less than 2%, the contemplated etching effect will not be obtained, whereas if it is in excess of 15%, the aluminum foil dissolves over the entire surface thereof, becomes impaired in its strength and will not be etched effectively. Most preferably, therefore, the hydrochloric acid concentration should be about 5 to about 8%.

While various acids, such as chromic acid, sulfuric acid, oxalic acid and phosphoric acid, form porous oxide films by virtue of anodic polarization, at least one of chromic acid and chromates is added to the electrolytic pre-etching solution of hydrochloric acid, because the chromate film formed on the surface of aluminum foil with use of chromic acid and/or chromates acts stably to inhibit dissolving of the foil surface, most effectively permitting formation of numerous deep etching pits in the aluminum foil. Examples of useful chromates are lead, sodium, potassium, cobalt, barium, silver and ammonium chromates. The etching solution contains chromic acid and/or chromate(s) in an amount (combined amount when more than one chromic compound is used) of 0.01 to 35%. When this concentration is less than 0.01%, the foregoing effects will not be fully obtained, whereas concentrations over 35% result in an inhibited etching effect, failing to form a satisfactory etched surface. More preferably, the concentration is 0.2 to 20%. The aluminum foil is subjected to anodic polarization in the presence of chlorine ion and chromic acid ion afforded by the use of the acid ingredients in the above-mentioned ranges, whereby numerous etching pits can be formed in the foil surface. Since the foil is covered with a chromate film except where it is pitted, the foil surface is inhibited from dissolving to assure formation of deep etching pits.

While the bath temperature, current density and quantity of electricity for the pre-etching step of course influence the etching effect, these conditions are suitably determined as already known in the art. For reference, such conditions will be described below.

When the bath temperature is below 50° C., a reduced etching effect will result, whereas temperatures over 100° C. permit dissolving of the foil over the entire surface. Accordingly, the bath temperature is preferably in the range of 50° to 100° C., more preferably 70° to 90° C.

When the current density is less than 5 A/dm$^2$, a reduced etching effect similarly results, whereas if it is over 40 A/dm$^2$, overall dissolving occurs. Accordingly, the current density should be in the range of 5 to 40 A/dm$^2$, preferably 10 to 25 A/dm$^2$.

The quanity of electricity for the pre-etching step is preferably in the range of 500 to 3000 coulombs/dm$^2$, most preferably 1500 to 2000 coulombs/dm$^2$. If it is less than 500 coulombs/dm$^2$, a lower etching effect will result, whereas if it is over 3000 coulombs/dm$^2$, the foil dissolves over the entire surface.

Since the pre-etching treatment is thus conducted under relatively severe conditions, the electrical resistance of the interior of the pits increases as the etching process proceeds owing to the evolved gas, released aluminum ion and chromate film formed to prevent effective etching in a relatively short period of time. Accordingly, the pre-etching treatment is completed at this stage, and the foil is subjected to the subsequent nitric acid treatment.

Step of nitric acid treatment

The intermediate nitric acid treatment is conducted prior to the post-etching treatment in order to dissolve away the thin chromate film formed by the pre-etching on the inner surfaces of the foil defining the etching pits. This enables the following step of electrolytic post-etching to effectively corrode the interior of the etching pits to increase the diameter and depth of the pits. Accordingly, it is most desirable to completely remove the chromate film from the pit-defining inner surfaces, but even if the chromate film is removed to such an extent as to partially remain in a small thickness, the above effect can be obtained correspondingly. On the other hand, it is desired that the chromate film over the outer surface of the aluminum foil except where it is pitted remain with a small thickness over the entire surface despite the nitric acid treatment, because the remaining chromate film prevents objectionable dissolving of the foil surface during the post-etching treatment. The nitric acid treatment for permitting a small thickness of chromate film to remain over the foil outer surface while removing the chromate film from the pit-defining inner surfaces can be carried out by suitably determining the treating conditions, especially the treating time, because the chromate film formed by the pre-etching step has a smaller thickness in the interior of the pits than over the outer surface and can be dissolved away from the pitted portions early. Although the chromate film is removable with use of acids other than nitric acid, nitric acid is most advantageous in economy and treating efficiency. For the treatment, nitric acid is used in the form of an aqueous solution having a concentration of 5 to 60%. If the nitric acid concentration is less than 5%, the above effect will not be obtained fully, whereas concentrations higher than 60% will not produce a noticeably enhanced effect and are therefore substantially useless. More preferably, the concentration is about 20 to about 40%.

As to the treating bath temperature and the treating time, an insufficient effect will result if the temperature is below 40° C. or the time is less than 1 minute. Conversely, temperatures higher than 90° C. or treating periods longer than 10 minutes will not produce an appreciably increased effect and are substantially of no benefit. Most preferably, the nitric acid treatment is conducted at a temperature of 50° to 80° C. for about 2 to about 5 minutes.

Electrolytic post-etching step

The nitric acid treatment is followed by electrolytic etching, which is intended specifically to concentrically attack the pitted portions formed by the pre-etching step to increase the diameter of the pits. An aqueous solution of hydrochloric acid is used for the post-etching step. For the same reason as in the case of the pre-etching step, the etching solution preferably has a concentration of 2 to 15%, most preferably 5 to 8%.

When the aluminum foil resulting from the nitric acid treatment and to be treated by post-etching has a thin chromate film remaining over the foil surface, the aqueous treating solution may contain only hydrochloric acid in the foregoing concentration range. However, to assure effective enlargement of the etching pits with the foil surface inhibited from dissolving, it is desirable to add a small amount of oxidizing acid to the aqueous solution of hyrochloric acid. The oxidizing acid forms an anodic oxide film over the aluminum foil surface by virtue of anodic polarization to inhibit the dissolving of the surface. Examples of suitable oxidizing acids are oxalic acid, phosphoric acid, chromic acid, boric acid, tartaric acid, succinic acid, maleic acid, etc. Such oxidizing acids should not be used at a high concentration. Similarly, sulfuric acid, which has high dissolving properties, is not suited to use, because this acid chemically dissolves the foil surface to result in a lower area increase ratio. The preferred concentration of the oxidizing acid, although variable with the kind of acid, is limited to as low as 0.03 to 3%, most preferably to 0.1 to 1%. If the concentration is less than 0.03%, the aluminum surface will not be inhibited from dissolving effectively, whereas if it is over 3%, the aluminum foil will dissolve over the entire surface thereof.

When the solution for the electrolytic post-etching step has too low a temperature, the etching pits formed by the pre-etching step can not be enlarged effectively, whereas excessively high bath temperatures permit overall dissolving. Accordingly, the bath temperature is preferably 50° to 100° C., most preferably 70° to 90° C.

Generally, the current density for the electrolytic post-etching step should be relatively low to avoid discontinuance of etching within the pits due to the evolution of gas. However, if the current density is lower than 0.5 A/dm$^2$, the proportion of chemical reaction becomes excessively high relative to the overall electrochemical reaction, with the result that the treatment fails to deepen the etching pits effectively, possibly permitting overall dissolving of the foil surface. Conversely, if the current density is in excess of 7 A/dm$^2$, the aluminum foil dissolves over the entire surface, hence objectionable. Accordingly, the current density should be in the range of 0.5 to 7 A/dm$^2$, most suitably 2 to 5 A/dm$^2$.

On the other hand, the quantity of electricity for the post-etching step, if less than 1000 coulombs/dm$^2$, is not fully effective in deepening and enlarging the etching pits, whereas if it is over 4000 coulombs/dm$^2$, overall dissolving occurs. Accordingly, the quantity is preferably 1000 to 4000 coulombs/dm$^2$, more preferably 2000 to 3000 coulombs/dm$^2$.

The present invention will be further described with reference to the following examples and comparative example.

EXAMPLES

Pieces of annealed aluminum foil, having a high purity of 99.99% and a thickness of 0.1 mm, for preparing test specimens were subjected first to electrolytic pre-etching treatment under the conditions given below, then to nitric acid treatment under the conditions listed in Table 1 and thereafter to electrolytic post-etching treatment under the following conditions.

Electrolytic pre-etching
Aqueous solution A: Containing 5% of hydrochloric acid and 2% of chromic acid
Aqueous solution B: Containing 5% of hydrochloric acid, 1% of chromic acid and b 0.1% of lead chromate
Temperature of solution: 80° C.
D.C. current density: 20 A/dm$^2$
Quantity of electricity: 1800 coulombs/dm$^2$
Etching time: 1 minute 30 seconds Electrolytic post-etching
Aqueous solution E: Containing 5% of hydrochloric acid and 0.2% of oxalic acid
Aqueous solution F: Containing 5% of hydrochloric acid
Temperature of solution: 75° C.
D.C. current density: 5 A/dm$^2$
Quantity of electricity: 2700 coulombs/dm$^2$
Etching time: 9 minutes

TABLE 1

| Specimen No. | Pre-etching solution | Nitric acid treatment | | | Post-etching solution |
|---|---|---|---|---|---|
| | | Solution | | | |
| | | Concn. (%) | Temp. (°C.) | Time (min) | |
| Comp. Ex. | A | — | — | — | E |
| Example | | | | | |
| 1 | A | 10 | 70 | 5 | E |
| 2 | A | 20 | 70 | 3 | E |
| 3 | A | 20 | 70 | 5 | E |
| 4 | A | 20 | 70 | 5 | F |
| 5 | A | 40 | 60 | 3 | E |
| 6 | A | 40 | 60 | 3 | F |
| 7 | A | 40 | 60 | 5 | E |
| 8 | A | 40 | 60 | 5 | F |
| 9 | A | 60 | 70 | 5 | E |
| 10 | A | 20 | 40 | 5 | E |
| 11 | A | 20 | 90 | 5 | E |
| 12 | A | 20 | 70 | 1 | E |
| 13 | A | 20 | 70 | 10 | E |
| 14 | B | 20 | 70 | 5 | E |
| 15 | B | 40 | 60 | 3 | E |

The etched pieces of foil were subjected to chemical conversion treatment in an aqueous solution of boric acid at a voltage of 380 V and then tested for capacitance and tensile strength. Table 2 below shows the results.

TABLE 2

| Specimen No. | Capacitance (μF/cm$^2$) | Tensile strength (kg/cm width) |
|---|---|---|
| Comp. Ex. | 0.785 | 2.01 |
| Example | | |
| 1 | 0.792 | 2.07 |
| 2 | 0.832 | 2.12 |
| 3 | 0.874 | 2.21 |
| 4 | 0.901 | 2.05 |
| 5 | 0.865 | 2.17 |
| 6 | 0.908 | 2.13 |
| 7 | 0.913 | 2.31 |
| 8 | 0.859 | 2.16 |
| 9 | 0.841 | 2.14 |
| 10 | 0.791 | 2.05 |
| 11 | 0.833 | 2.07 |
| 12 | 0.797 | 2.05 |
| 13 | 0.823 | 2.19 |
| 14 | 0.924 | 2.30 |
| 15 | 0.927 | 2.29 |

The results of Table 2 reveal that the specimens according to the present invention have more excellent electrical characteristics, i.e. greater capacitance, and higher strength than the specimen of the comparative example which has not been treated with nitric acid.

What is claimed is:

1. A process for treating the surface of aluminum foil for use as an electrode of electrolytic capacitors characterized in that the aluminum foil is subjected to an electrolytic pre-etching treatment in an aqueous solution containing hydrochloric acid and at least one compound selected from the group consisting of chromic acid and chromates, then to an intermediate nitric acid treatment, and thereafter to an electrolytic post-etching treatment in an aqueous solution containing hydrochloric acid, or hydrochloric acid and an oxidizing acid.

2. A process as defined in claim 1 wherein the aqueous solution for the electrolytic pre-etching treatment contains 2 to 15% of hydrochloric acid and 0.01 to 35% of said at least one compound.

3. A process as defined in claim 2 wherein the electrolytic pre-etching treatment is conducted at a bath temperature of 50° to 100° C. and at a current density of to 40 A/dm$^2$.

4. A process as defined in claim 1 wherein the nitric acid treatment is conducted in an aqueous solution containing 5 to 60% of nitric acid.

5. A process as defined in claim 4 wherein the nitric acid treatment is conducted at a bath temperature of 40° to 90° C. for 1 to 10 minutes.

6. A process as defined in claim 1 wherein the aqueous solution for the electrolytic post-etching treatment contains 2 to 15% of hydrochloric acid, or 2 to 15% of hydrochloric acid and 0.03 to 3% of the oxidizing acid.

7. A process as defined in claim 6 wherein the electrolytic post-etching treatment is conducted at a bath temperature of 50° to 100° C. and at a current density of 0.5 to 7 A/dm$^2$.

* * * * *